United States Patent
Andersson et al.

(10) Patent No.: US 9,338,423 B2
(45) Date of Patent: May 10, 2016

(54) METHOD FOR DISPLAYING A VIRTUAL IMAGE

(75) Inventors: Ingmar Andersson, Linköping (SE); Folke Isaksson, Linköping (SE); Leif Haglund, Brokind (SE)

(73) Assignee: SAAB AB, Linköping (SE)

( * ) Notice: Subject to any disclaimer, the term of this patent is extended or adjusted under 35 U.S.C. 154(b) by 736 days.

(21) Appl. No.: 12/810,352

(22) PCT Filed: Dec. 22, 2008

(86) PCT No.: PCT/SE2008/000739
§ 371 (c)(1),
(2), (4) Date: Sep. 23, 2010

(87) PCT Pub. No.: WO2009/084993
PCT Pub. Date: Jul. 9, 2009

(65) Prior Publication Data
US 2011/0019904 A1 Jan. 27, 2011

(30) Foreign Application Priority Data
Dec. 27, 2007 (EP) ..................... 07445047

(51) Int. Cl.
*G06K 9/00* (2006.01)
*H04N 13/00* (2006.01)
*G06T 7/00* (2006.01)

(52) U.S. Cl.
CPC .......... *H04N 13/0003* (2013.01); *G06T 7/0077* (2013.01); *G06T 2207/10012* (2013.01); *G06T 2207/20088* (2013.01); *G06T 2207/30181* (2013.01)

(58) Field of Classification Search
None
See application file for complete search history.

(56) References Cited

U.S. PATENT DOCUMENTS

| 5,517,419 A | 5/1996 | Lanckton et al. |
| 6,175,648 B1 | 1/2001 | Ayache et al. |

(Continued)

FOREIGN PATENT DOCUMENTS

| EP | 0 897 163 A1 | 2/1999 |
| EP | 1 209 623 A2 | 5/2002 |

(Continued)

OTHER PUBLICATIONS

Lu, et al "Stereo Image Matching Using Robust Estimation and Image Analysis Techniques for DEM Generation", International Archives of Photogrammetry and Remote Sensing, vol. XXXIII, Part B3, Amsterdam, 2000.*

(Continued)

*Primary Examiner* — Ulka Chauhan
*Assistant Examiner* — Patrick F Valdez
(74) *Attorney, Agent, or Firm* — Venable LLP; Jeffri A. Kaminski

(57) ABSTRACT

A method for displaying a virtual image of three dimensional objects in an area using stereo recordings of the area for storing a pixel and a height for each point of the area. A method is obtained of enabling displaying of vertical surfaces or even slightly downwards and inwards inclined surfaces. Stereo recordings from at least three different stereo recordings of different solid angles are used. For each different solid angle at least one data base including data about texture and height pixel point wise is established. Data for displaying the virtual image are combined from the different data bases in dependence of the direction in which the virtual image is to be displayed.

18 Claims, 5 Drawing Sheets

(56) References Cited

U.S. PATENT DOCUMENTS

| | | | |
|---|---|---|---|
| 6,573,912 B1* | 6/2003 | Suzuki et al. | 715/757 |
| 6,747,686 B1* | 6/2004 | Bennett | 348/145 |
| 7,102,666 B2* | 9/2006 | Kanade et al. | 348/159 |
| 7,733,342 B2* | 6/2010 | Kim et al. | 345/426 |
| 7,831,089 B2* | 11/2010 | Ofek et al. | 382/154 |
| 8,111,904 B2* | 2/2012 | Wallack et al. | 382/152 |
| 2002/0154213 A1 | 10/2002 | Sibyama et al. | |
| 2004/0105090 A1* | 6/2004 | Schultz et al. | 356/141.5 |
| 2007/0122027 A1* | 5/2007 | Kunita et al. | 382/154 |
| 2009/0304236 A1* | 12/2009 | Francini et al. | 382/109 |

FOREIGN PATENT DOCUMENTS

| | | |
|---|---|---|
| JP | H-11355806 A | 12/1999 |
| JP | 2000215311 A | 8/2000 |
| WO | WO-2009/003529 A1 | 1/2009 |

OTHER PUBLICATIONS

Zhou, Q. "Digital Terrain Modelling", [online], [retrieved Feb. 21, 2013], URL: http://web.archive.org/web/20070702025300/http://geog.hkbu.edu.hk/geog3600/lect-09.pdf, Jul. 2, 2007.*

Haala et al, "Generation of 3D City Models from Digital Surface Models and 2D Gis", IAPRS, vol. 32, Sep. 1997.*

Sima et al, "Optimizing the use of Airborne Images for 2.5D Visualization", GeoInformation in Europe, M.A. Gomarsca (ed.), Millpress, Netherlands, ISBN 9789059660618, Feb. 2007.*

Haala et al, "3D Urban GIS from Laser Altimeter and 2D Map Data", IAPRS, vol. 32, pp. 339-346, 1998.*

Jones C. "Field of View", http://chrisjones.id.au/FOV/fovtext.htm, [online], [retrieved Mar. 5, 2015], 2004.*

T. Kanade; Immersion into visual media: new applications of image understanding, IEEE Expert; Feb. 1996; vol. 11 Issue 1; pp. 73-80.

PCT/ISA/210—International Search Report—Mar. 26, 2009.

PCT/IPEA/409—International Preliminary Report on Patentability—Apr. 7, 2010.

European Search Report, dated Jun. 24, 2008, issued in counterpart Application No. EP 07 44 5047.

Gallego, Antonio Javier, et al., "3D Reconstruction and Mapping from Stereo Pairs with Geometrical Rectification," *Grupo de Informatica Industrial e Inteligencia Artificial*, pp. 318-327; 2007.

Yocky, David A., et al., Terrain Elevation Mapping Results From Airborne Spotlight-Mode Coherent Cross-Track SAR Stereo, *IEEE Transactions on Geoscience and Remote Sensing*, vol. 42, No. 2, pp. 301-308, Feb. 2004.

* cited by examiner

Fig. 1
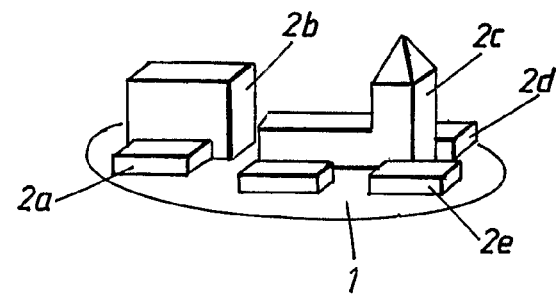
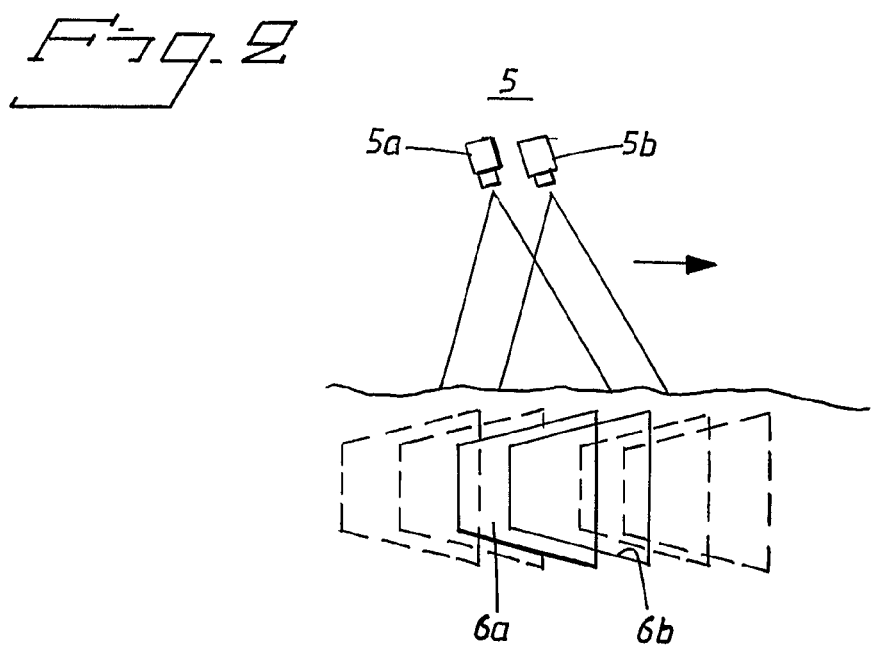
Fig. 2

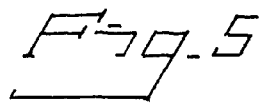
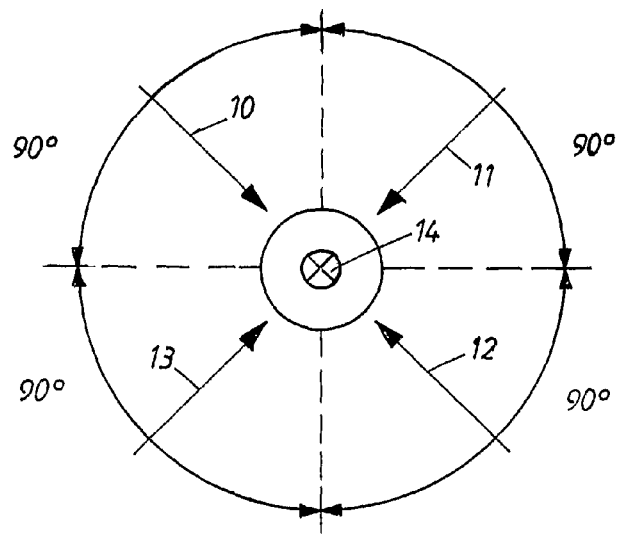
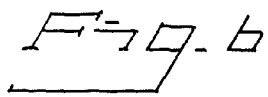

Fig. 7

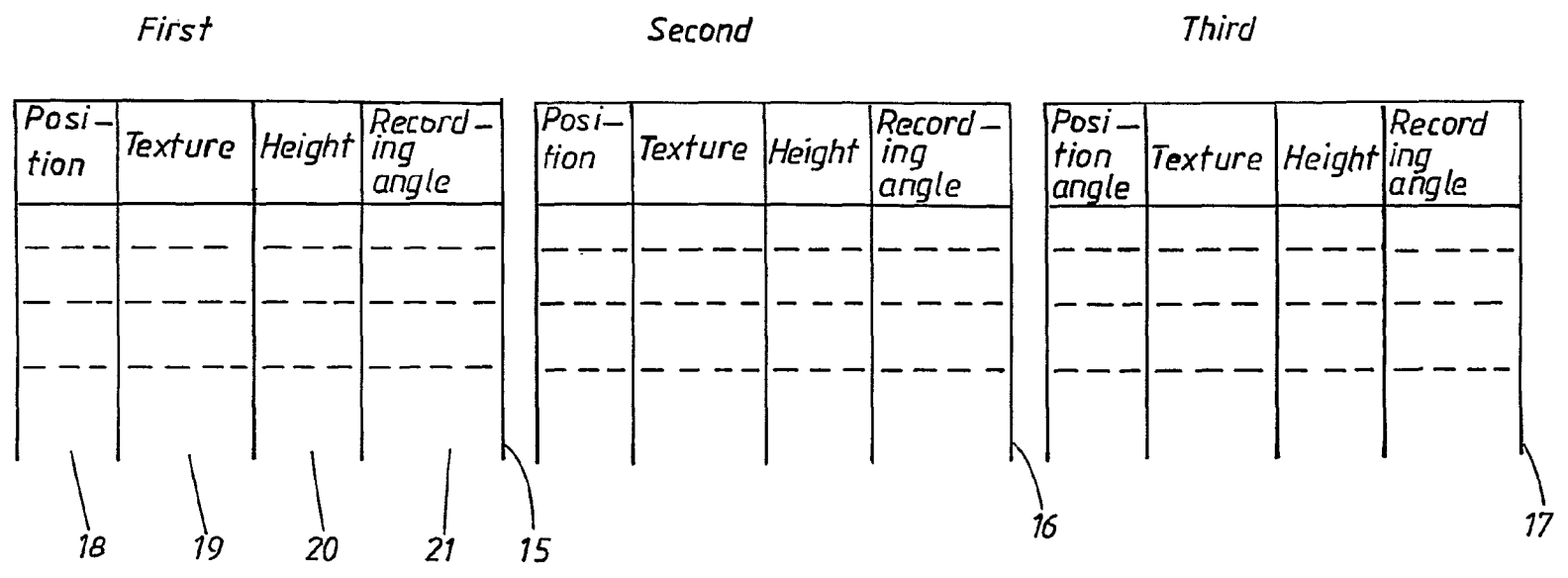

| First | | | | | Second | | | | | Third | | | |
|---|---|---|---|---|---|---|---|---|---|---|---|---|---|
| Position | Texture | Height | Recording angle | | Position | Texture | Height | Recording angle | | Position | Texture | Height | Recording angle |
| --- | --- | --- | --- | | --- | --- | --- | --- | | --- | --- | --- | --- |
| --- | --- | --- | --- | | --- | --- | --- | --- | | --- | --- | --- | --- |
| --- | --- | --- | --- | | --- | --- | --- | --- | | --- | --- | --- | --- |

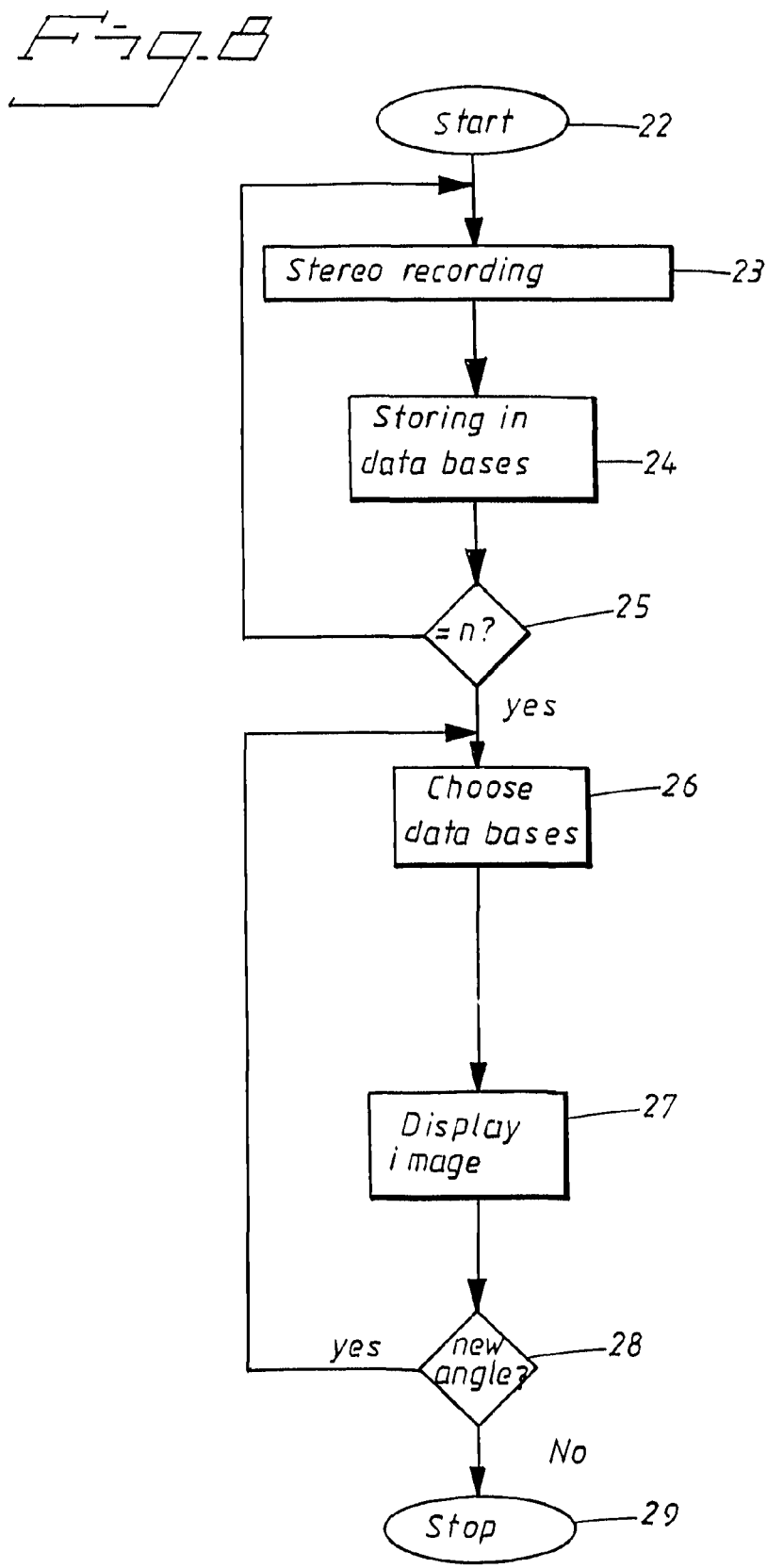

METHOD FOR DISPLAYING A VIRTUAL IMAGE

CROSS-REFERENCE TO RELATED APPLICATIONS

This application claims priority to European patent application number 07445047.9 filed 27 Dec. 2007 and is the nation phase under 37 C.F.R. §371 of PCT/SE2008/000739 filed 22 Dec. 2008.

FIELD OF THE INVENTION

The present invention relates to a method for displaying a virtual image of three dimensional objects in an area using stereo recordings of the area for storing a pixel and a height for each point of the area.

BACKGROUND OF THE INVENTION

It is previously known within mapping to generate and store a pixel and a height for each point on the ground. Resolutions that can be used are for example one meter or one decimeter on ground. The two data stored for each point describe texture and height in that point and referred to a suitable coordinate system. When producing these data it is necessary to be in possession of two different image recordings from somewhat different positions but generally rather close to the vertical line. These images can be displayed as orthophotos.

Stereo recording is per se previously known and it can for example be referred to U.S. Pat. No. 6,175,648 disclosing a multi image stereo processing method. A plurality of measurements are chosen or weighted into a common data base. Methods of obtaining height information from stereo recordings are inter alia discussed in our patent application PCT/EP2007/056780 filed Apr. 4, 2007.

One problem with this kind of data storing is that there is no possibility to store vertical surfaces or surfaces that are inclined inwards. A typical example of vertical surfaces is walls of houses but also other objects such as formations in the nature inclined inwards. When a wall of a house is shown from aside, the vertical surfaces are interpolated between roof and ground and no texture of the walls at all are available. Furthermore the height calculations are generally somewhat interpolated resulting in that the house walls or fronts are inclined outwards and due to that an image showing the front of a house does not look like the real house front.

An object with the present invention is to obtain a method enabling displaying of vertical surfaces or even slightly downwards and inwards inclined surfaces.

SUMMARY OF THE INVENTION

The object of the invention is obtained by a method characterized in that stereo recordings from at least three different stereo recordings of different solid angels are used to cover the area, that for each different solid angel at least one data base comprising data about texture and height pixel point wise is established, and that data for displaying the virtual image are combined from the different data bases in dependence of the direction in which the virtual image is to be displayed. By introducing at least three different stereo recordings and corresponding data bases, information regarding the area to be displayed is also available for vertical surfaces and surfaces tapering downwards towards the ground. Information about vertical and inclined surfaces is now available in at least one of the data bases.

According to a preferred development of the method data for displaying the virtual image for a solid angle are combined from data bases connected to two or more stereo recordings.

According to another preferred development of the method of the invention data for displaying the virtual image is chosen from the data base connected to the stereo recording closest in angle to the direction in which the virtual image is to be displayed. By choosing data from the stereo recording closest in angle involving a chosen elevation angle, down to one data base at a time may be used. This inter alia results in that the processing complexity can be kept down.

According to still a preferred development of the method three different stereo recordings are used having solid angles projections in a ground plane separated substantially 120 degrees from each other to cover an azimuth of substantially 120 degrees each and that data are fetched from the data bases covering an azimuth that the projection of the direction in the ground plane of the virtual image to be displayed points out. The use of three stereo recordings enables to keep down the number of data at the same time as the area to be displayed can be covered from all directions in question. In this connection the different stereo recordings could be recorded about 30 degrees from a vertical line perpendicular to the ground plane.

In order to increase the image quality, the number of data bases and different stereo recordings are increased according to favourable developments of the method. According to a proposed method four different stereo recordings are used having solid angles projections in a ground plane separated substantially 90 degrees from each other to cover an azimuth of substantially 90 degrees each and that data are fetched from the data base covering an azimuth that the projection of the direction in the ground plane of the virtual image to be displayed points out. In this connection the different stereo recordings could be recorded about 45 degrees from a vertical line perpendicular to the ground plane.

In order to further increase the image quality an additional stereo recording substantially perpendicular to a ground plane is used to cover a circular solid angel from which data base data are fetched for directions of the virtual image to be displayed perpendicular to or almost perpendicular to the ground plane.

Furthermore, according to a possible development of the method, data from more than one data base could be interpolated close to transitions between different stereo recordings. This could strengthen the image quality in the part of the stereo recordings having lower image quality.

According to another proposed development of the method it is proposed to express the heights as angular heights.

Another variant of the method is to store information about recording angle in the data bases in addition to texture and height information.

According to still another variant of the method information from the different data bases are used to calculate measures of objects, such as distances, areas and volumes.

BRIEF DESCRIPTION OF THE DRAWINGS

The invention will now be described in more detail with reference to the accompanying drawings in which:

FIG. 1 schematically illustrates image recording of an area.

FIG. 2 schematically illustrates stereo recording.

FIG. 5 illustrates a third example of stereo recordings to be used according to a method for displaying a virtual image of three dimensional objects in accordance with the invention.

FIG. 6 schematically illustrates a first example of data bases suitable for the stereo recording example of FIG. 3.

FIG. 7 schematically illustrates a second example of data bases suitable for the stereo recording example of FIG. 3.

FIG. 8 is a flow chart showing an example how to process information.

DETAILED DESCRIPTION OF EMBODIMENTS OF THE INVENTION

Figure 3:
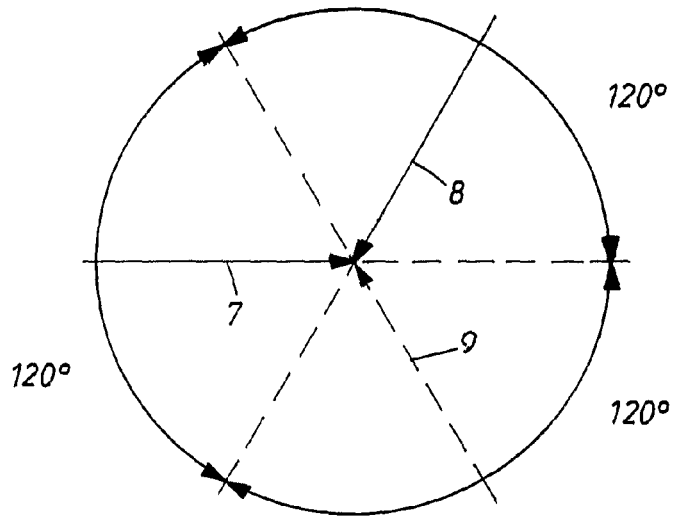
FIG. 3 illustrates a first example of stereo recordings to be used according to a method for displaying a virtual image of three dimensional objects in accordance with the invention.

In FIG. 1 an area 1 with buildings 2a-2f are recorded from an aircraft 3 by means of a recording equipment 4. Instead of an aircraft any other movable carrier could be used such as a satellite, a land vehicle or a watercraft. So the recording can be effected from air, ground or sea and even directly from ground recording the ground for example by the activity of a human being.

In FIG. 2 stereo recording of an area is illustrated. An image capturing unit 5 is comprised. At a first time this image capturing unit is located at a first position 5a so as to capture an image of an area 6a. At a second time, the image capturing unit is located at a second position 5b so as to capture an image of an area 6b. In this way a plurality of at least partly overlapping images each covering at least a part of the area 1 shown in FIG. 1 are generated. As an alternative the image capturing unit of FIG. 2 can be regarded to comprise a plurality of image capturing sub units 5a and 5b fixed mounted in relation to each other. The images of the areas 6a and 6b captured by the image capturing sub units 5a, 5b are then in one example captured at the same time.

In FIG. 3 a first example of stereo recordings to be used according to a method for displaying a virtual image of three dimensional objects in accordance with the invention is shown. According to this example the area 1 is stereo recorded from at least three directions. When seen in the ground plane of the area 1 as an example the recordings could be from north illustrated by arrow 7 and ±120 degrees angle in azimuth illustrated by arrows 8 and 9. In elevation three recordings is proposed to deviate about 30 degrees from a vertical line perpendicular to the ground plane of the area 1. For each of these three recordings a data base is set up comprising at least data about texture and height for each point in the area 1. Introduction of data bases in this way based upon stereo recordings in three different solid angles results in that all house fronts are visible in one or more of the data bases.

When displaying the virtual image in the most straight forward way each displayed pixel are chosen from the data base closest in angle to the direction of display of the three data bases. If, for example, a viewer looks straight downwards all three data bases will be used as input data in "a piece of cake" each piece of about 120 degrees of the displayed image. If the viewer looks straight south, data is only fetched from the data base recorded from north according to the example given above.

In a corresponding way data is fetched from one of the corresponding of the other two data base recordings when looking in a direction deviating about +120 degrees or −120 degrees, respectively, from south. It is also possible to fetch data from more than one data base and in particular this can be used when the direction of viewing strongly deviates from the recording direction. So, for example, when looking south with a viewing field of 180 degrees, data relating to the rightmost and leftmost of the displayed image is advantageously fetched from more east and west related data bases, respectively. In this way so called curtains are avoided in the displayed image.

When operating as above the texture of the house walls or fronts is present and a better description of the "height" of the actual house wall or front is obtained. These measures all together result in a more attractive image presentation of houses and other objects.

In the example given above and the further examples to be discussed below the recording angle and the angles of the data bases can be the same, but it is also possible to operate with angles that more or less differ between recording angle and data based angles.

Figure 4:
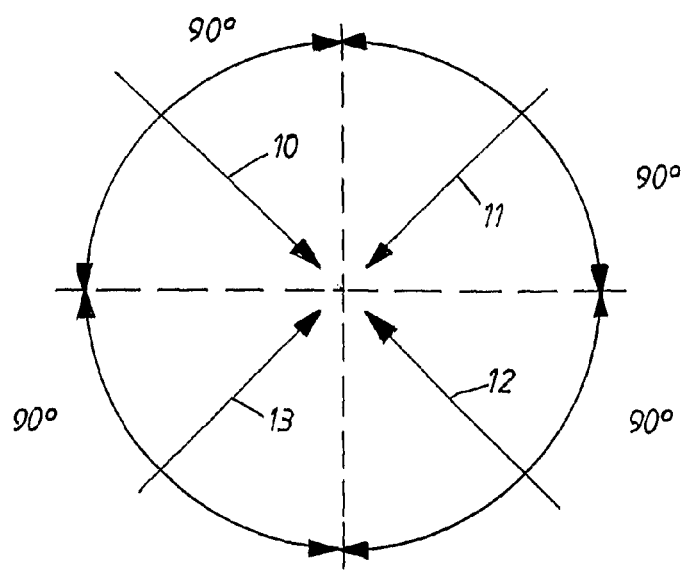
FIG. 4 illustrates a second example of stereo recordings to be used according to a method for displaying a virtual image of three dimensional objects in accordance with the invention.

FIG. 4 shows a second example of stereo recordings to be used according to a method for displaying a virtual image of three dimensional objects in accordance with the invention. According to this example the area 1 is stereo recorded from four directions illustrated by arrows 10-13 so that the ground plane are divided into four sections covering 90 degrees each in azimuth. For each of these four recordings a data base is set up and used in a way corresponding to the process described with reference to FIG. 3.

In order to further enhance the method for displaying virtual images of three dimensional objects, it is according to FIG. 5 proposed to use stereo recordings from five directions using five separate data bases. In this case four of the directions are similar to those described in FIG. 4 and denoted with arrows 10-13. In addition to these four directions a fifth direction 14 is used recorded close to a direction perpendicular to the ground plane and covering a circular solid angle. This last mentioned recording is similar to the process of capturing ortho photo images. When displaying an image the fifth recording can be used to cover an angle of about 30 degrees upright from the ground plane. A suitable recording elevation angle for the other four recordings could be about 45 degrees.

In an even further enhanced method further data bases could be used. For example nine data bases could be used. In such a case one data base could be recorded from straight above, while four data bases could be recorded at a first elevation angle of for example 25 degrees and another four data bases at a second elevation angle of for example 45 degrees, the recording of the four data bases at each elevation angle being separated in azimuth by about 90 degrees.

According to the method exemplified with reference to FIG. 3 an angle deviating from a vertical line of about 30 degrees is proposed. With reference to FIG. 4 the corresponding angle is proposed to be about 45 degrees. These angels are only to be seen as proposals and it is possible to choose any other suitable angels. For example the angle could amount to 90 degrees and even more, resulting in that vertical surfaces, such as house walls, are optimally imaged in a straight forward direction.

It is also to be observed that the different sectors or pieces of a cake according to FIGS. 3 and 4 may contain data, pixel point wise, collected from more than one angle.

In FIG. 6 a first example of data bases for a three direction stereo recording is schematically shown suitable for the stereo recording example discussed with reference to FIG. 3. Each recording direction is allotted a date base 15, 16 and 17, respectively. Each such data base contains at least information regarding position 18 of a pixel point, the texture 19 of the pixel and height information 20 for the pixel point. In this connection the height does not need to be expressed explicitly but can be expressed as an angular height, for example a 30-degrees-height. The angular height in this connection can be defined as the height project to the focal plane of the camera in the projection direction of the data base.

FIG. 7 proposes a slight different set of data bases suitable for the stereo recording example discussed with reference to FIG. 3. In this case information about recording angle 21 is added to the data bases 15-17.

The data stored in data bases as schematically shown in FIGS. 6 and 7 are also available as information usable to calculate measures of objects, such as distances, areas and volumes.

In FIG. 8 a flow chart is shown schematically illustrating, as an example, how information can be processed. The process is initiated from a start block 22. First of all it is ensured that stereo recordings needed for the final image presentation is available. Block 23 provides these stereo recordings. Stereo recording has already been discussed with reference to FIG. 2 and FIGS. 3-5 suggest suitable recording directions to cover an area to be shown.

In subsequent step information from the stereo recordings are stored in data bases, block 24, one data base being allotted each stereo recording. As already discussed with reference to FIGS. 6 and 7, the data bases comprise information about texture 19 and height 20 referred to pixel points. Block 25 sets the number n of stereo recordings to be processed and the minimum number is set to three.

In block 26 a choice of data base takes place. In the most straight forward process the data base is chosen that has been recorded in a direction closest in angle to the direction in which the virtual image is to be displayed. In order to deal with the data bases, a so called viewer could be used. Such a viewer has knowledge about the data bases available and that can be used. As a start this viewer calculates the respective data bases to be used for the different areas in the image to be displayed. When the image originates from different data bases, particular algorithms can be used to smooth out the transitions in the image. One way of doing this is interpolation. Then the viewer carries out the usual calculations in connection to image displaying. So the same three dimensional effects that are carried out today are to be considered. This means that when you move virtually and look in different directions you can perceive the three dimensional effects and that different objects in the image are hidden behind each other.

In the next step 27 the information from the chosen data base is displayed as an image on a screen of a suitable display device. In case that the direction of the virtual image to be displayed is changed, that is a new angle is desired, see block 28, the process is repeated from the input of block 26. Otherwise the process is stopped, see block 29.

The invention is not limited to the examples described above but may be modified within the scope of the attached claims.

The invention claimed is:

1. A method for displaying a virtual image of three dimensional objects in an area using stereo recordings of the area for storing a pixel and a height for each point of the area, the method comprising:
    covering the area using stereo recordings from at least three different stereo recordings of different solid angles, the solid angles surrounding the area and converging toward a center of the area,
    establishing for each different solid angle at least one data base comprising data about, position, texture and height pixel point wise for that solid angle, wherein the databases include information about all vertical and inclined surfaces in the area, and
    combining the data for displaying the virtual image on a pixel point level from the different data bases in dependence of an arbitrary direction about the area in which the virtual image is to be displayed.

2. The method according to claim 1, wherein the data for displaying the virtual image for a solid angle are combined from data bases connected to two or more stereo recordings.

3. The method according to claim 1, wherein the data for displaying the virtual image are chosen from the data bases connected to the stereo recording closest in angle to the direction in which the virtual image is to be displayed.

4. The method according to claim 1, wherein three different stereo recordings are used having solid angle projections in a ground plane separated substantially 120 degrees from each other to cover an azimuth of substantially 120 degrees each, and wherein the data are fetched from the data bases covering an azimuth that the projection of the direction in the ground plane of the virtual image to be displayed points out.

5. The method according to claim 4, wherein the different stereo recordings are recorded about 30 degrees from a vertical line perpendicular to the ground plane.

6. The method according to claim 1, wherein four different stereo recordings are used having solid angles projections in a ground plane separated substantially 90 degrees from each other to cover an azimuth of substantially 90 degrees each, and wherein the data are fetched from the data bases covering an azimuth that the projection of the direction in the ground plane of the virtual image to be displayed points out.

7. The method according to claim 6, wherein the different stereo recordings are recorded about 45 degrees from a vertical line perpendicular to the ground plane.

8. The method according to claim 1, wherein an additional stereo recording substantially perpendicular to a ground plane is used to cover a circular solid angle from which data base data are fetched for directions of the virtual image to be displayed perpendicular to or almost perpendicular to the ground plane.

9. The method according to claim 1, wherein the data from more than one data base are interpolated close to transitions between different stereo recordings.

10. The method according to claim 1, wherein the heights are expressed as angular heights.

11. The method according to claim 1, wherein information about recording angle is stored in the data bases in addition to texture and height information.

12. The method according to claim 1, wherein information from the different data bases are used to calculate measures of objects.

13. The method according to claim 12, wherein the measures of objects comprise distances, areas or volumes.

14. The method according to claim 1, wherein the stereo recordings are captured at different times.

15. The method according to claim 1, wherein the stereo recordings are captured by one stereo recorder.

16. A method for displaying a virtual image of three dimensional objects in an area using stereo recordings of the area for storing a pixel and a height for each point of the area, the method comprising:
    covering the area using stereo recordings from at least three different stereo recordings of different solid angles, the solid angles surrounding the area and converging toward a center of the area,
    establishing for each different solid angle at least one data base comprising data about, position, texture and height pixel point wise for that solid angle, wherein information about all vertical and inclined surfaces in the area can be obtained from the databases, and combining the data for displaying the virtual image on a pixel point level angle from data bases connected to two or more stereo recordings in dependence of an arbitrary direction about the area in which the virtual image is to be displayed.

17. A method for displaying a virtual image of three dimensional objects in an area using stereo recordings of the area for storing a pixel and a height for each point of the area, the method comprising:

covering the area using stereo recordings from at least three different stereo recordings of different solid angles, the solid angles surrounding the area and converging toward a center of the area, establishing for each different solid angle at least one data base comprising data about, position, texture and height pixel point wise for that solid angle, wherein information about all vertical and inclined surfaces in the area can be obtained from the databases, and combining the data for displaying the virtual image on a pixel point level from the different data bases in dependence of an arbitrary direction about the area in which the virtual image is to be displayed and selecting the data from the data bases connected to the stereo recording closest in angle to the direction in which the virtual image is to be displayed.

18. The method according to claim 1, wherein all vertical surfaces are visible in one or more of the databases.

* * * * *